United States Patent
Moser

(10) Patent No.: US 9,733,110 B2
(45) Date of Patent: Aug. 15, 2017

(54) HOUSING EQUIPPED WITH A VIEWING WINDOW

(71) Applicant: Endress + Hauser Flowtec AG, Reinach (CH)

(72) Inventor: Thierry Moser, Sierentz (FR)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/647,613

(22) PCT Filed: Nov. 12, 2013

(86) PCT No.: PCT/EP2013/073584
§ 371 (c)(1),
(2) Date: May 27, 2015

(87) PCT Pub. No.: WO2014/082849
PCT Pub. Date: Jun. 5, 2014

(65) Prior Publication Data
US 2015/0308867 A1    Oct. 29, 2015

(30) Foreign Application Priority Data

Nov. 30, 2012  (DE) .......... 10 2012 111 662

(51) Int. Cl.
*G01D 11/24*  (2006.01)
*G01D 11/26*  (2006.01)

(52) U.S. Cl.
CPC ........... *G01D 11/26* (2013.01); *G01D 11/245* (2013.01)

(58) Field of Classification Search
CPC ................................................... G01D 11/24
(Continued)

(56) References Cited

U.S. PATENT DOCUMENTS 2,599,212 A * 6/1952 Triplett ............... G01R 1/02
                                              220/378
2,659,105 A   11/1953 Halbig
(Continued)

FOREIGN PATENT DOCUMENTS

DE    7404312        5/1974
DE    10153100 A1    5/2003
(Continued)

OTHER PUBLICATIONS

German Search Report, German PTO, Munich, DE, Oct. 11, 2013.
(Continued)

*Primary Examiner* — Lisa Caputo
*Assistant Examiner* — Jamel Williams
(74) *Attorney, Agent, or Firm* — Bacon & Thomas, PLLC

(57) ABSTRACT

A housing equipped with a viewing window. The housing includes: a housing segment which adjoins a radially inwardly extending shoulder, which terminally externally surrounds a housing opening conically tapering from the housing interior toward the housing exterior. Flushly mounted in the opening, a disk shaped viewing window pane, which has bordering on its outwardly facing surface an external lateral surface conically tapering form the housing interior toward the housing exterior. A one-piece, shaped seal, which has a first portion, which externally completely surrounds the viewing window pane, and which has a second portion, which lies against an outer edge of a surface of the viewing window pane facing inwards into the housing. A support ring secured in the housing segment clamps the viewing window pane in the housing segment.

10 Claims, 3 Drawing Sheets

(58) Field of Classification Search
USPC .......................................................... 73/431
See application file for complete search history.

(56) References Cited

U.S. PATENT DOCUMENTS

| | | | | |
|---|---|---|---|---|
| 4,154,116 A | * | 5/1979 | Stahn | G01L 7/04 |
| | | | | 73/738 |
| 4,333,348 A | | 6/1982 | Berninger | |
| 4,378,174 A | | 3/1983 | Hesse | |
| 4,753,112 A | * | 6/1988 | Wetterhorn | G01D 11/24 |
| | | | | 73/431 |
| 5,029,472 A | | 7/1991 | Falck | |
| 5,506,403 A | * | 4/1996 | Yamada | H01J 9/24 |
| | | | | 250/207 |
| 6,168,566 B1 | * | 1/2001 | Lia | G01L 7/084 |
| | | | | 600/488 |
| 7,717,434 B2 | | 5/2010 | Blessing | |
| 7,963,169 B2 | | 6/2011 | Dietmeier | |
| 2006/0005643 A1 | | 1/2006 | Kesseler | |
| 2009/0241661 A1 | * | 10/2009 | Dietmeier | G01L 19/14 |
| | | | | 73/323 |
| 2010/0196087 A1 | | 8/2010 | Langer | |
| 2010/0196642 A1 | | 8/2010 | Langer | |

FOREIGN PATENT DOCUMENTS

| | | |
|---|---|---|
| EP | 0008351 A2 | 3/1980 |
| EP | 0145457 A2 | 6/1985 |
| EP | 0863697 A2 | 9/1998 |
| EP | 2107345 A1 | 10/2009 |
| EP | 2213405 A1 | 8/2010 |
| EP | 2213406 A1 | 8/2010 |
| GB | 1080595 | 7/1963 |
| JP | S62251123 A | 10/1987 |

OTHER PUBLICATIONS

International Search Report, EPO, The Netherlands, Apr. 17, 2014.
English Translation of the International Preliminary Report on Patentability, WIPO, Geneva, CH, Jun. 11, 2015.

* cited by examiner

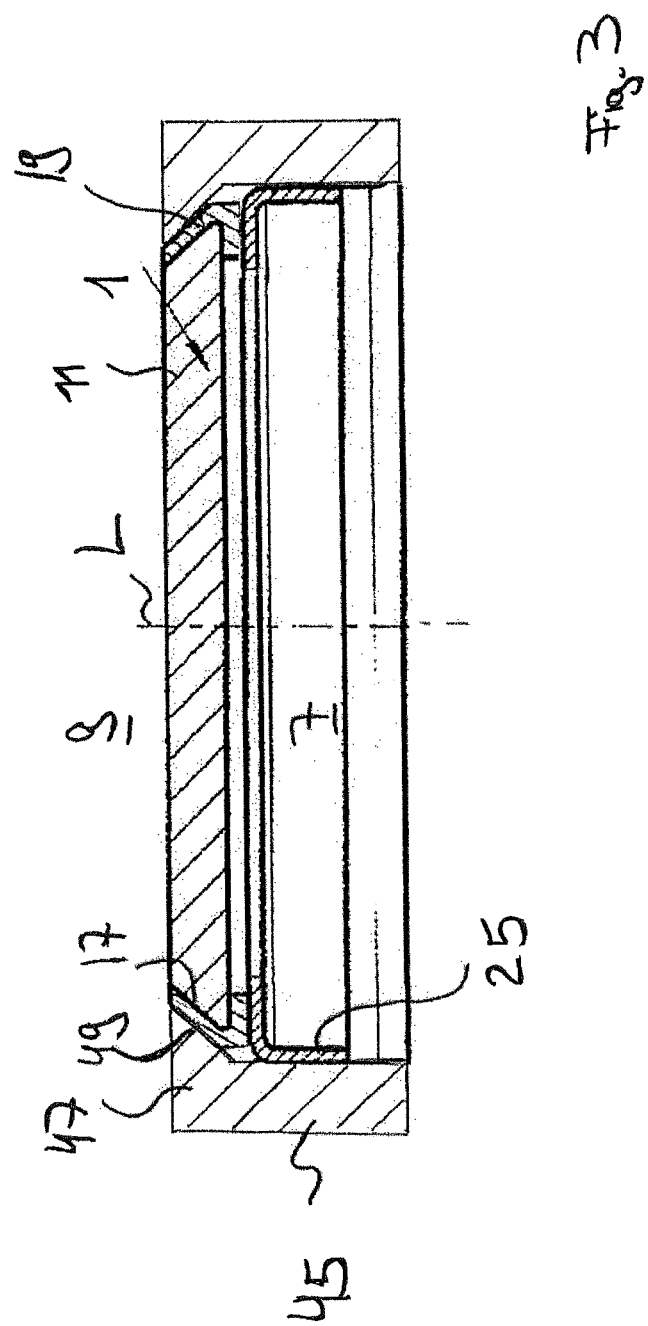

HOUSING EQUIPPED WITH A VIEWING WINDOW

TECHNICAL FIELD

The invention relates to a housing equipped with a viewing window.

BACKGROUND DISCUSSION

Housings equipped with viewing windows are applied in, among other fields of use, industrial measurements technology. Forming an example of this are measuring devices, in the case of which there is provided in a housing an on-site display, especially for display of measured values and/or operating parameters, which are externally perceivable through the viewing window.

Placed on housings with viewing windows, especially for their use in industrial measurements technology, are a number of requirements, depending on location of use. Among these are especially hygienic requirements for applications in the pharmaceuticals and foods industries.

Already in use today are viewing window equipped housings, which have an outer wall, in which, as a rule, a circular opening is provided, which is in communication with the interior of the housing. Used for the viewing window pane is usually a planar, as a rule, circular disk shaped, piece of glass or plastic, whose area is greater than the area of the opening. This disk is secured in the interior of the housing in such a manner that an outer edge of the disk lies on an inner side of the outer wall surrounding the opening.

These housings have the advantage that the outer wall of the housing provides a mechanically stable bearing surface for the viewing window with reference to pressures occurring in the housing interior.

Disadvantageous is that, in the outwardly located part of the opening before the pane, water or fouling from the environment of the housing can collect. In this way, with time, deposits can form on the viewing window.

The opening forms a hollow space, which is difficult to keep clean. Correspondingly, these housings are not suitable for applications with high hygienic requirements.

Moreover, deposits in the opening can lead to a degrading of the visibility of the housing interior through the viewing window.

Published international application, WO 2012/000526 A1 describes a housing equipped with a viewing window, in the case of which the viewing window contains a planar, plastic pane, which is mounted flushly in an opening in the housing. For this, an outer edge of the disk shaped viewing window pane lies with interpositioning of a seal on an outwardly facing surface of a ledge surrounding the opening in the outer wall. The disk-shaped viewing window includes an outer lateral surface conically tapering in in the direction facing out of the housing, and is mechanically secured on the surface of a ledge by means of forming of a bead of the material of the housing surrounding the opening and the surface of a ledge in order to produce a shape interlocking connection in such a manner that the resulting joint between viewing window and housing on the outside of the housing forms an essentially jointless, step free transition.

The forming of the bead represents an additional, technically demanding, working step, in the case of which the applied plastic pane is, in given cases, mechanically strongly loaded. Consequently, only plastic materials can be applied, which can withstand such loading.

In contrast, industrial applications regularly require use of a viewing window pane of a material, which due to its chemical and mechanical properties is optimally suitable for the particular application. In such case, depending on application, different chemical properties, such as e.g. chemical durability for exposure to acids, bases or aggressive cleaning agents, and physical properties, such as e.g. temperature resistance, scratch resistance or a smooth surface, are required.

SUMMARY OF THE INVENTION

It is an object of the invention to provide an as versatilely usable as possible housing equipped with a viewing window.

For this, the invention resides in a housing comprising
a housing segment,
on an outwardly facing end of which adjoins a radially inwardly extending shoulder, which terminally externally surrounds a housing opening, which conically tapers smaller from the housing interior toward the housing exterior,
flushly mounted in the opening, a disk shaped viewing window pane,
which has bordering on its outwardly facing surface an external lateral surface conically tapering smaller from the housing interior toward the housing exterior,
a one-piece, shaped seal, which has a first portion, which externally completely surrounds the viewing window pane, and which has a second portion, which lies against an outer edge of a surface of the viewing window pane facing inwards into the housing, and
provided secured in the housing segment, a support ring, which clamps the viewing window pane in the housing segment.

In a first embodiment of the invention, the shoulder has terminally adjoining the housing segment and extending perpendicularly to the longitudinal axis of the housing segment a wall region, on which adjoins terminally a wall region surrounding the opening and conically tapering smaller from the housing interior toward the housing exterior.

Additionally, the invention includes a second embodiment of the invention, in the case of which
only a portion of the viewing window pane adjoining the outwardly facing surface of the viewing window has externally a conical lateral surface, and
the shoulder has, terminally adjoining the housing segment and extending perpendicularly to the longitudinal axis of the housing segment, a wall region, whose inner lateral surface surrounding the opening is conical.

In the case of both of these embodiments, the housing segment and the shoulder are composed preferably of one-piece of sheet material, especially a sheet of stainless steel, and the support ring is preferably welded to the housing segment.

Additionally, the invention includes a third embodiment of the invention, in the case of which
the external conical lateral surface of the viewing window pane extends over the entire thickness of the viewing window pane, and
the radially inwardly extending shoulder has a lateral surface facing into the interior of the housing segment and conically tapering smaller from the housing interior toward the housing exterior.

In the case of this third embodiment, the housing segment and the shoulder are preferably of metal, especially aluminum, and the support ring is preferably screwed into the housing segment or riveted to the housing segment.

The viewing window panes of the housing of the invention are preferably glass or plastic, and the shaped seals of the housing of the invention are preferably elastomer.

The housings of the invention have due to the flushly mounted viewing window pane the advantage that they are outwardly gap and notch free and therewith are also suitable for use in applications, e.g. in the pharmaceuticals or foods industries, where high hygienic and cleanability requirements are present.

Since the shaped seal covers all window pane outer surfaces affected by the mechanical clamping of the viewing window pane, the viewing window pane is protected from mechanical loadings related to the clamping, especially it is protected against warping. The material of the viewing window pane can, thus, be largely freely selected, and, thus, optimally matched to the requirements at the location of use.

BRIEF DESCRIPTION OF THE DRAWINGS

The invention and other advantages will now be explained in greater detail based on the figures of the drawing, in which three examples of embodiments are shown; equal parts are provided in the figures with equal reference characters. The figures of the drawing show as follows:

FIG. 3 is a sectional view of a third example of an embodiment of a housing of the invention equipped with a viewing window.

DETAILED DISCUSSION IN CONJUNCTION WITH THE DRAWINGS

Figure 1:
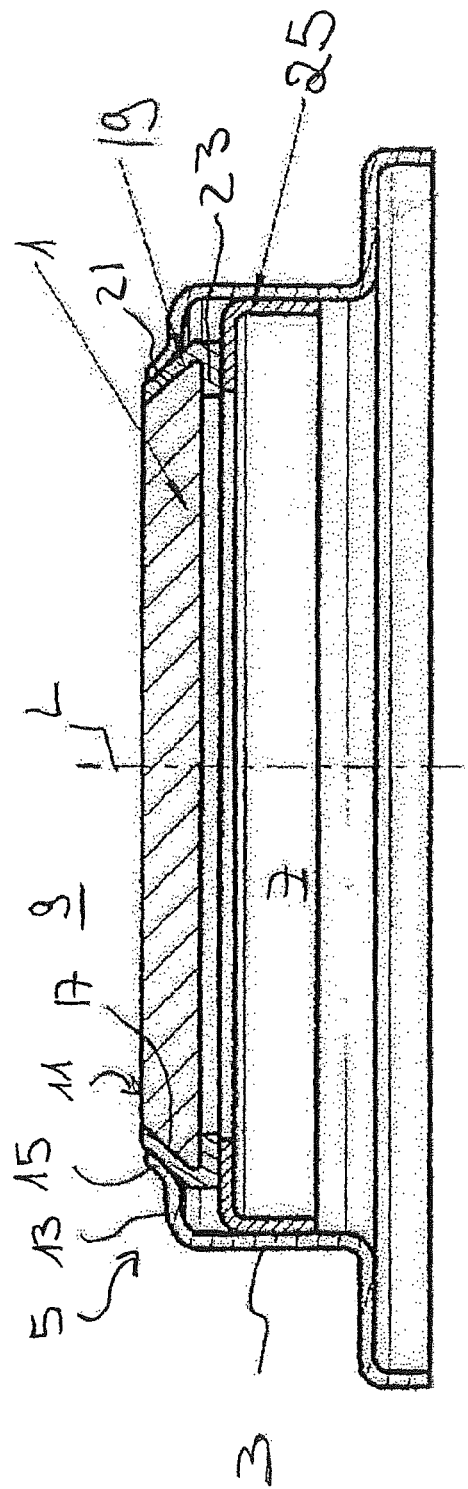
FIG. 1 is a sectional view of a first example of an embodiment of a housing of the invention equipped with a viewing window.

FIG. 1 shows a sectional view of a first example of a housing of the invention equipped with a viewing window, respectively window pane 1.

The housing is, for example, a housing of a measuring device for measuring process variables or a housing of an on-site display. These housings are applied e.g. in measuring and control technology and in process automation in industrial plants. Via the viewing window, respectively window pane 1, a portion of the housing interior covered by the viewing window, respectively window pane 1, is externally perceivable. Arranged in the perceivable portion is, for example, a display (not shown), such as an LED display.

The housing includes a housing segment 3 with an end pointing out of the housing and, adjoining the end, a radially inwardly extending shoulder 5, which terminally, externally surrounds an opening 11 of the housing conically tapering smaller from the housing interior 7 toward the housing exterior 9.

This is implemented in the example of an embodiment illustrated in FIG. 1 by features including that the shoulder 5 has terminally adjoining the housing segment 3 and extending perpendicularly to the longitudinal axis L of the housing segment 3 a wall region 13, on which adjoins terminally a wall region 15 surrounding the opening 11 and conically tapering smaller from the housing interior 7 toward the housing exterior 9.

In such case, the housing segment 3 and the shoulder 5 are preferably one piece of sheet material, especially a sheet of stainless steel, which can be formed, for example, in a deep draw method.

Housing segment 3 is, for example, part of a housing lid. It is here embodied as a cylindrical element with circularly shaped base. Alternatively, it could also have a rectangular or square base.

Viewing window pane 1 is disc shaped and has an external lateral surface 17 bordering on its outwardly facing surface and conically tapering smaller from the housing interior 7 toward the housing exterior 9.

Viewing window pane 1 is composed preferably of glass or a transparent plastic.

Viewing window pane 1 is framed by a one-piece, shaped seal having a first portion 21, which completely externally surrounds the viewing window pane 1, and a second portion 23, which lies against an outer edge of a surface of the viewing window pane 1 facing inwards into the housing. The shaped seal 19 is composed, for example, of an elastomer.

The viewing window pane 1 bordered by the shaped seal 19 is flushly mounted in the opening 11. Then, a support ring 25 is introduced from the housing interior 7 in such a manner into the housing segment 3 that the edge region of the surface of the viewing window pane 1 facing into the housing interior 5 and covered by the second portion of the shaped seal 19 lies against an annular end face of the support ring 25 facing out of the housing segment 3.

Then, the support ring 25 is secured in the housing segment 3. For this, the support ring 25 can, for example, be welded into the housing segment 3.

This matter of securing the viewing window pane 1 enables a material protecting, flushly mounted installation. Since all bearing surfaces of the viewing window pane 1 are covered by the shaped seal 19, the viewing window pane 1 is cushioned from mechanical loads and especially protected from warping resulting from clamping forces. Accordingly, the material of the viewing window pane 1 can be selected with great freedom and therewith be matched optimally to the requirements of the respective application, in which the housing should lastly be applied. Due to the flush mounting of the viewing window pane 1, the housing in the region of the viewing window pane is largely gap and notch free and easy to clean. The housing can, thus, be directly applied also in applications, in which high requirements for hygiene and/or cleanability of the housing are present.

Figure 2:
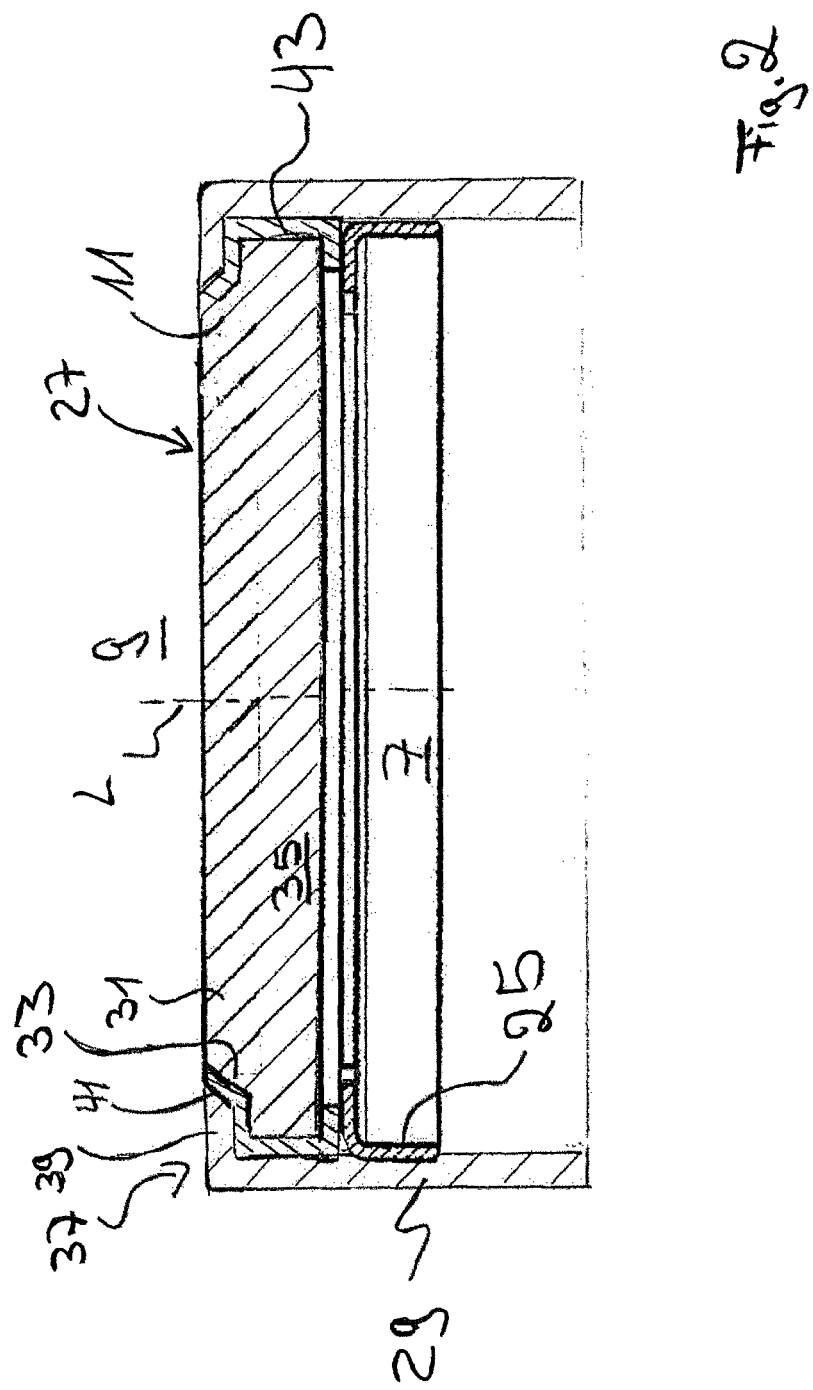
FIG. 2 is a sectional view of a second example of an embodiment of a housing of the invention equipped with a viewing window.

FIG. 2 shows a further example of a housing of the invention equipped with a viewing window 27. Also in this case, the viewing window 27 is mounted in the above described, load free manner in a cylindrical housing segment 29, so that only the differences compared with the example of an embodiment of FIG. 1 will be explained.

In the example of an embodiment illustrated in FIG. 2, only a portion 31 of the viewing window pane 27 adjoining the outwardly facing surface of the viewing window 27 has an external, conical, lateral surface 33. The remaining portion of the viewing window pane 27 bordering on the conical portion 31 has a greater cross sectional area than the conical portion 31.

Also here, terminally adjoining on the housing segment 29, a radially inwardly extending shoulder 37 is provided, which externally surrounds opening 11 and conically tapers smaller from the housing interior 7 toward the housing exterior 9. This includes here, extending perpendicular to the longitudinal axis L of the housing segment 29, a wall region 39, which ends inwardly with a lateral surface 41 conically surrounding the opening 11. The thickness of the wall region equals the thickness of the conical portion 31 of the viewing window pane 27.

Also here, the viewing window pane 27 is framed by a shaped seal 43, which surrounds the entire external lateral surface of the viewing window pane 27, as well as the outer edge of its surface facing into the housing interior 7. The viewing window pane 27 inserted into the shaped seal 43 is also here clamped in the housing segment 29 by means of the support ring 25 and closes the housing flushly on the outside.

FIG. 3 shows a further example of an embodiment of a housing of the invention equipped with a viewing window. Viewing window pane 1 is identical to that illustrated in FIG. 1 and is mounted in the above described manner in a housing segment 45.

Exactly as in the case of the example of an embodiment illustrated in FIG. 1, the viewing window pane 1 also has here an external conical lateral surface 17, which extends over the entire thickness of the viewing window pane 1.

Formed on the housing segment 45 terminally is also here a radially inwardly extending shoulder 47. Housing segment 45 and shoulder 47 are here manufactured as a one-piece element of metal, e.g. aluminum. While sheet metal pieces have, as a rule, a wall thickness 1.5 mm-2 mm, the wall thickness of housing segment 45 and shoulder 47 amounts here to, for example, 3 mm-4 mm.

Shoulder 47 includes terminally facing into the interior of the housing segment 45 and conically tapering smaller from the housing interior 7 toward the housing exterior 9 a lateral surface 49, which surrounds the conical lateral surface 17 of the viewing window pane 1.

Also here, the viewing window pane 1 is framed by a shaped seal 19, which surrounds the entire external lateral surface 17 of the viewing window pane 1, as well as the outer edge of its surface facing into the housing interior 7. The viewing window pane 1 inserted into the shaped seal 17 is clamped by means of the support ring 25 in the housing segment 45 and closes the housing flushly on the outside. The support ring is, for example, screwed into or riveted to the housing segment 45.

The invention claimed is:

1. A housing, comprising:
a housing segment, on an outward facing end of which adjoins a radially inwardly extending shoulder, which terminally externally surrounds a housing opening conically tapering from the housing interior toward the housing exterior;
a disk shaped viewing window pane flushly mounted in said opening, which pane including bordering on its outwardly facing surface, an external lateral surface conically tapering from said housing interior toward said housing exterior;
a one-piece shaped seal, which includes a first portion, which externally completely surrounds said viewing window pane, and which includes a second portion, which lies against an outer edge of a surface of said viewing window pane facing inwards into said housing; and
a support ring provided secured in said housing segment, which clamps said viewing window pane in said housing segment; wherein:
for cushioning said viewing window pane from mechanical loads and for making the housing largely gap free and easy to clean in a region of the viewing window pane, all bearing surfaces of the viewing window pane are covered by said shaped seal.

2. The housing as claimed in claim 1, wherein:
said shoulder has terminally adjoining said housing segment and extending perpendicularly to the longitudinal axis of said housing segment a wall region, on which adjoins terminally a wall region surrounding said opening and conically tapering smaller from said housing interior toward said housing exterior.

3. The housing as claimed in claim 1, wherein:
only a portion of said viewing window pane adjoining the outwardly facing surface of said viewing window pane has externally a conical lateral surface; and
said shoulder has, terminally adjoining said housing segment and extending perpendicularly to the longitudinal axis of said housing segment, a wall region, whose inner lateral surface surrounding said opening is conical.

4. The housing as claimed in claim 1, wherein:
said housing segment and said shoulder are composed of one-piece of stainless steel sheet material.

5. The housing as claimed in claim 4, wherein:
said support ring is welded to said housing segment.

6. The housing as claimed in claim 1, wherein:
said external conical lateral surface of said viewing window pane extends over the entire thickness of said viewing window pane; and
said radially inwardly extending shoulder has a lateral surface facing into the interior of said housing segment and conically tapering smaller from said housing interior toward said housing exterior.

7. The housing as claimed in claim 6, wherein:
said housing segment and said shoulder are of aluminum.

8. The housing as claimed in claim 7, wherein:
said support ring is screwed into said housing segment or riveted to said housing segment.

9. The housing as claimed in claim 1, wherein:
said viewing window pane is glass or plastic.

10. The housing as claimed in claim 1, wherein:
said shaped seal is an elastomer.

* * * * *